Patented July 16, 1940

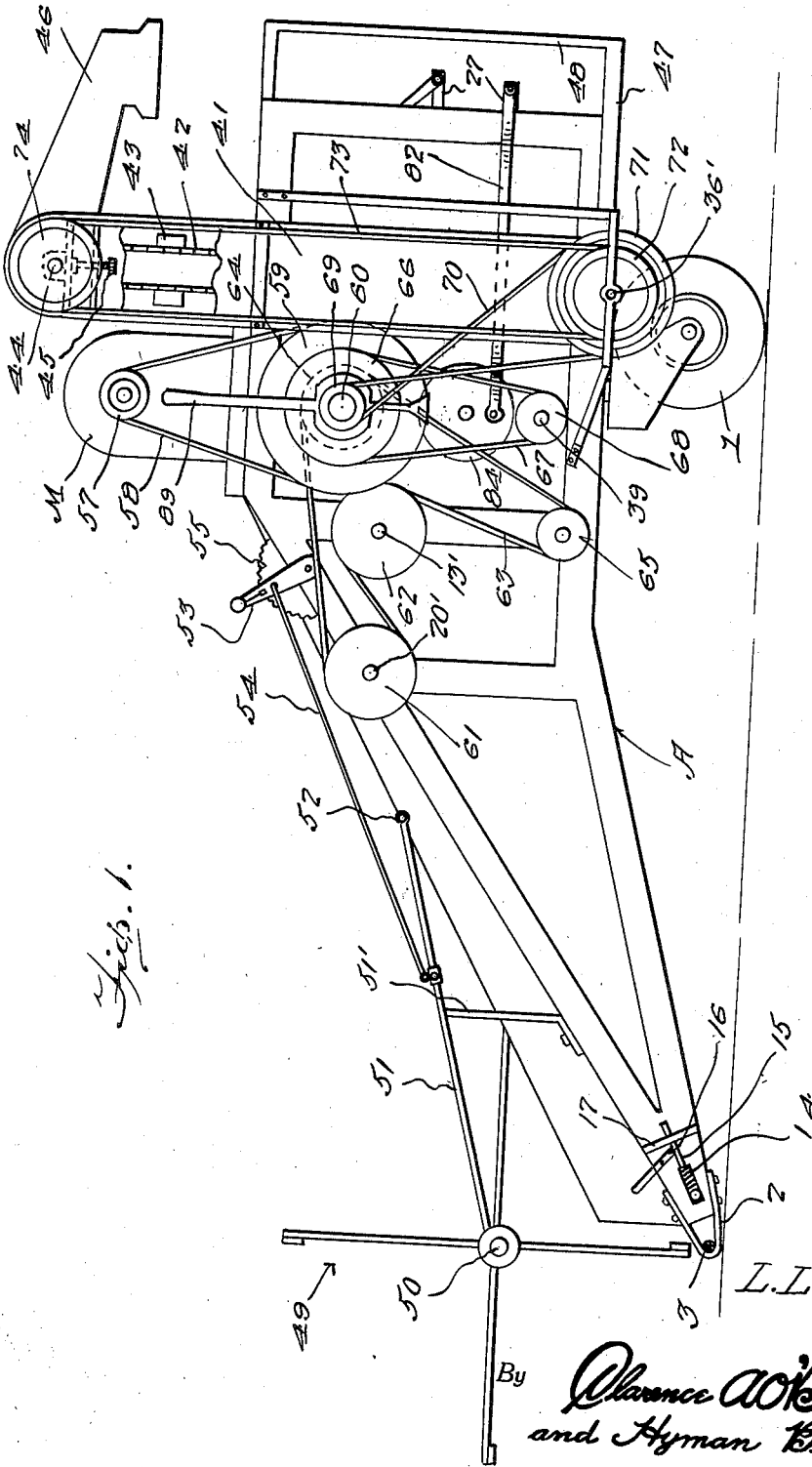

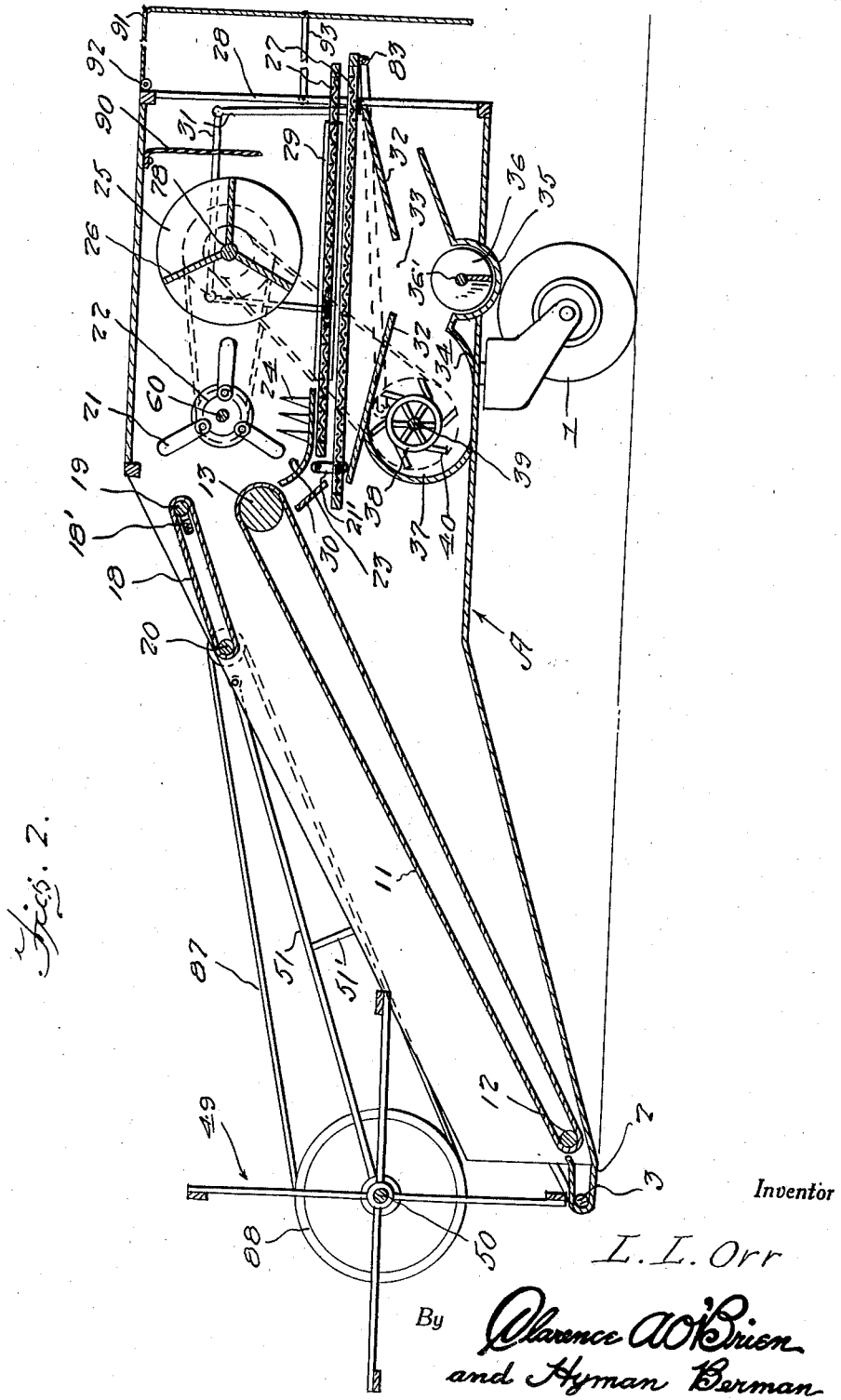

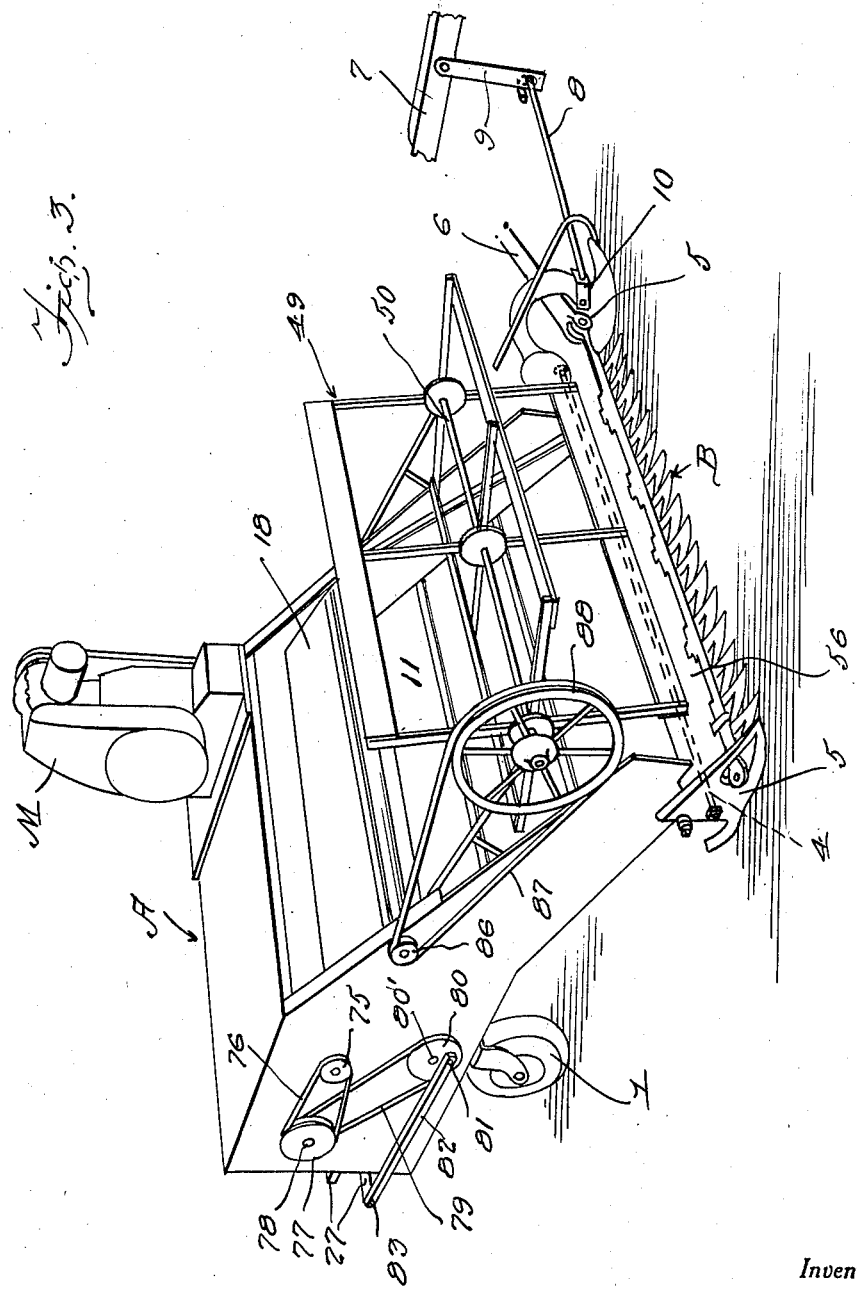

2,208,278

UNITED STATES PATENT OFFICE 2,208,278

THRESHING ATTACHMENT FOR MOWING MACHINES

Leibert L. Orr, Hickory, Ky.

Application July 21, 1938, Serial No. 220,569

4 Claims. (Cl. 56—207)

This invention relates to a threshing attachment for various types of mowing machines, the general object of the invention being to provide a machine which can be readily attached to a part of the mowing machine so as to be drawn along by the mowing machine, with means for conveying the grain cut by the mowing machine to threshing and separator means of the attachment where the grain is threshed from the straw and the grain separated from the straw and chaff and conveyed to an elevator which will deposit the grain into sacks.

Another object of the invention is to provide a motor for the attachment with means for driving all the movable parts of the attachment from the motor.

Another object of the invention is to provide means for adjusting the various parts whereby the device can handle short and long stalks as well as various kinds of grain.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a side elevation of the invention.

Figure 2 is a vertical longitudinal sectional view thereof.

Figure 3 is a perspective front view of the invention and showing parts of a mowing machine.

In these drawings the letter A indicates a frame of any suitable construction and having its rear portion forming a substantially rectangular-shaped housing with its front portion sloping downwardly and forwardly and tapering downwardly. The rear portion is supported by the castor wheels 1 and the side members of the front portion are provided with the brackets 2 having holes 3 therein through which passes a long rod or bolt 4 which also passes through the inner and outer shoes 5 of the cutter bar assembly B of a mowing machine (not shown). However, the pitman of this machine is shown at 6 and the drawbar at 7. I provide a rod 8 which has its front end hooked over the depending bracket 9 carried by the drawbar 7 and a yoke 10 is connected with the rear end of the bar 8 and is suitably connected to the inner shoe 5 of the mowing machine. This rod 8 places the side draft of the cutter bar on the tongue or drawbar 7 of the mower and, of course, the rod 4 connects the front end of the attachment frame A with the cutter assembly of the mowing machine as shown more particularly in Figure 3.

An upwardly and rearwardly extending conveyor belt 11 receives the grain cut by the mowing machine and conveys it into the rear housing part of the frame, this belt passing over the lower front roller 12 and the rear roller 13 rotatably supported in the forward part of the frame, the belt being held under tension by the spring means 14 suitably engaging end portions of the roller 12, a rod 15 actuated by a lever 16 applying tension to the spring means with the rod held in tensioning position by a pin 16 passing therethrough and engaging a bar 17 forming part of the frame and through which the rod 15 passes. A short endless belt 18 is located above the upper end of the belt 11 and is carried by the upper and lower rollers 19 and 20, this belt 18 cooperating with the belt 11 to direct the straw into the housing where it will be acted upon by the beater arms 21 of the drum 22 which cooperates with the concave 23 provided with the teeth 24. As shown in Figure 2, these beater arms 21 are pivotally connected at their inner ends to the drum so that they have free swinging movement and they act with the teeth of the concave 23 to flay the grain from the straw. A thresher cylinder 25 is arranged in rear of the drum 22 and is formed with the beater blades 26. Upper and lower shaker screens 27 are insertable and removable through an opening 28 formed in the rear of the housing and the upper screen is supported by the guideways 29, the front portion of the upper screen passing under the concave and the front portion of the lower screen projecting beyond the front end of the upper screen and an inclined plate 30 directs any grain passing between the front end of the concave and the conveyor belt 11 onto the lower screen. The forward end of the lower screen is mounted on an eccentric 27' so that said lower screen during its reciprocation will have upward and downward motion to kick material therein in a rearward direction. The upper screen is reciprocated from the lower screen by means of the linkage 31. A pan 32 receives the grain from the lower screen and said pan has an opening 33 at its center with the pan sloping upwardly and outwardly from the opening so that the grain will gravitate toward the opening. A second pan 34 is arranged under the pan 32 for receiving the grain falling through the opening 33 and said pan 34 is formed with a transverse trough 35 in which is placed a spiral conveyor 36. The front end of the pan 34 forms a fan housing 37 in which is located an elongated fan cylinder 38 carried by a shaft 39, the cylinder being provided with the blades 40. This fan will force an air blast through the space between the pan 32 and pan 34 so as to blow chaffs and other foreign matter from the grain dropping through the opening 33 and through the opening at the rear of the housing.

The spiral conveyor 36 delivers the grain from the trough 35 into the lower end of an elevator housing 41 supported at one side of the housing in any suitable manner and in this elevator housing is arranged an endless chain 42 carrying the buckets 43, the chain passing over upper and lower sprockets, the lower one of which is rotatably arranged on an extended part of the shaft 36′ of the spiral conveyor 36 and the upper sprocket being fastened to a shaft 44, the journals of which are adjustable by screws 45 for tightening the chain. The buckets deposit the grain into a chute 46 leading from the upper end of the elevator housing and sacks are adapted to be supported by the platform 47 and the frame 48 so that these sacks will receive the grain falling from the chute 46. A reel 49 has its shaft 50 journaled in the front end of the bars 51 pivoted at 52 to parts at the front portion of the frame and the reel is adapted to be lowered and raised by means of a hand lever 53 connected to one of the rods 51 by a link 54 and having its detent engaging a segment 55 for holding the parts in adjusted position. This reel acts to move the grain cut by the mower upon the conveyor 11 and a shield 56, see Figure 3, extends from the cutter assembly B over the lower end of the conveyor belt 11 to prevent any loose grain from falling between the belt and the rear edge of the cutter bar.

A motor M of any suitable construction is supported on the top of the housing and has a pulley 57 on its shaft over which a belt 58 passes to a pulley 59 which is connected to the shaft 60 of the beater cylinder or drum 22. A pulley 61 is connected with a pintle of the roller 20 of belt 18 and a pulley 62 is connected with the pintle 13′ of the roller 13 of the belt 11. A belt 63 passes over a pulley 64 on shaft 60, around the pulley 61, then over the pulley 62 and then around a pulley 65, this pulley 65 being an idle one, and then the belt 63 passes back to the pulley 64. As will be seen this belt 63 will drive the roller 20 in an anti-clockwise direction and the pulley 13 in a closewise direction so that the lower reach of belt 18 and the upper reach of belt 11 move rearwardly to feed the straw into the housing. A pulley 66 is connected with the shaft 60 and a belt 67 passes over this pulley 66 and over a pulley 68 on the shaft 39 of the fan cylinder 38 so as to drive the fan cylinder. A pulley 69 is connected with the shaft 60 and a cross belt 70 passes over this pulley 69 and over a pulley 71 on the shaft 36′ of the spiral conveyor 36 to drive said spiral conveyor. A pulley 72 is connected with the shaft 36′ and a belt 73 passes over this pulley and over a pulley 74 connected with the shaft 44 which carries the sprockets of the bucket chain 42. At the opposite side of the housing a pulley 75 is connected with the shaft 60 and a belt 76 passes thereover and over a pulley 77, of double construction, on the shaft 78 of the beater cylinder 25 and said shaft 78 carries the second pulley over which a belt 79 passes which also passes over a pulley 80 secured on a shaft 80′ journaled in the housing. A disk 84 is secured to the other end of the shaft 80′ and crank pins 81 are secured to the pulley 80 and the disk 84 to which pitmans 82 are pivoted, the pitmans being connected, as at 83, with the lower screen 27. A pulley 86 is connected to the opposite pintle of the roller 20 and a belt 87 passes over this pulley 86 and over a large pulley 88 on the shaft 50 of the reel 49. Thus it will be seen that all the movable parts of the apparatus are driven from the motor M and from the shaft 60 and the various pulleys on this shaft, shown in Figure 1, are engaged with and disengaged from the shaft by means of suitable clutch means, the handle of which is shown at 89. Thus by releasing the clutch means through means of this handle 89 all the parts can be disconnected from the motor.

The tension of the belt 18 can be adjusted through the adjustable tensioning means shown generally at 18′ in Figure 2.

It will be seen that all the movable parts of the machine are operated from the motor and independently of the mower and that the parts are adjustable for short and long grains and for various kinds of grains. The reel will move the straw and shattered seed over the shield 56 onto the conveyor belt 11 which moves this material upwardly and rearwardly into the housing, the belt 18 facilitating all of this material passing into the housing and prevents any straw being blown from the apparatus. After the material enters the housing it is acted upon by the beater arms or fingers 21 and the teeth 24 of the concave and the material is moved rearwardly over the upper screen 27 where it is again acted upon by the blades of the cylinder 25. The grain flayed from the straw will pass through the screens 27 and the straw will be discharged from the opening 28 at the rear of the housing and drop upon the ground. An apron 90 is suspended from the rear portion at the top of the housing to prevent the beater 25 from throwing grain through the rear of the housing and a windshield 91 including a horizontal part and a depending vertical part is hingedly connected to the top of the rear wall of the housing, as shown at 92, the hinge pin being removable so that the shield 91 can be removed when desired. This shield is raised on its hinge when the screens 27 are to be changed and a rod 93 supports the shield from the rear of the housing, the rod being detachably connected with the housing in any suitable manner. The screens are given a reciprocatory motion and the lower screen is given a pitch motion from the front to the rear so that they pitch the chaff out of the rear and allow the seed to drop into the pan 32. Different sizes of screens should be provided for different sizes and types of seed and grain. As the grain falls through the opening 33 of the pan 32 any chaff remaining therein is blown therefrom by the blast from the fan so that the grain drops into the trough 35 practically free of foreign matter. Then the cleaned grain or seed is moved by the spiral conveyor 36 into the elevator, the buckets of which elevate the grain to the chute from which the seed or grain falls into a bag supported on the platform 47.

As before stated by manipulating the lever 53 the reel 49 can be raised and lowered to suit the height of grain being cut and when the reel is in lowered position the rods 51 rest upon the uprights 51′ carried by the front portion of the frame.

Thus with this attachment the grain cut by the mowing machine is threshed, the seed or grain separated from the chaff and straw, the straw being deposited upon the ground in rear of the apparatus and the grain lifted by the elevator and discharged to bags supported on the platform 47.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. In a threshing attachment for a mowing machine, a housing, a concave in the housing, interchangeable screens located in the housing, means for shaking the screens, front and rear beaters in the top part of the housing, the front beater including pivoted fingers for cooperating with the concave to separate the grain from the straw and the rear beater also acting to separate the grain from the straw and to discharge the straw through the rear of the housing, a pan having an opening therein receiving the grain from the screens, a second pan below the first pan for receiving the grain dropping through the opening, a blower between the front portions of the two pans for blowing chaff from the grain dropping through the opening of the first pan and means for actuating the movable parts of the attachment.

2. In a threshing attachment for a mowing machine, a housing, a concave in the housing, interchangeable screens located in the housing, means for shaking the screens, front and rear beaters in the top part of the housing, the front beater including pivoted fingers for cooperating with the concave to separate the grain from the straw and the rear beater also acting to separate the grain from the straw and to discharge the straw through the rear of the housing, a pan having an opening therein receiving the grain from the screens, a second pan below the first pan for receiving the grain dropping through the opening, a blower between the front portions of the two pans for blowing chaff from the grain dropping through the opening of the first pan, means for actuating the movable parts of the attachment, and a wind shield hinged to the upper end of the rear wall of the housing and extending downwardly.

3. In a threshing attachment for a mowing machine which includes a housing enclosing threshing mechanism, a substantially trough-shaped member sloping downwardly and forwardly from the open front end of the housing, an endless conveyor in said trough-shaped member for conveying material from the front end of said member upwardly and rearwardly into the housing, an endless belt located in the rear part of the trough shaped member and spaced above the rear portion of the conveyor, rollers over which the belt passes and a reel at the front end of the trough-shaped member for forcing cut material into the trough-shaped member and upon the conveyor.

4. In a threshing attachment for a mowing machine which includes a housing enclosing threshing mechanism, a substantially trough-shaped member sloping downwardly and forwardly from the open front end of the housing, an endless conveyor in said trough-shaped member for conveying material from the front end of said member upwardly and rearwardly into the housing, an endless belt located in the rear part of the trough-shaped member and spaced above the rear portion of the conveyor, rollers over which the belt passes and a reel at the front end of the trough-shaped member for forcing cut material into the trough-shaped member and upon the conveyor, arms pivoted to an intermediate part of the trough-shaped member at the upper end thereof, bearing means at the front ends of said arms for the shaft of the reel, means for rotating the reel, means for actuating the conveyor and the belt and manually operated means for raising and lowering the arms to adjust the reel vertically.

LEIBERT L. ORR.